United States Patent [19]
Landa

[11] Patent Number: 6,064,495
[45] Date of Patent: May 16, 2000

[54] METHOD AND APPARATUS FOR HALF-TONE PRINTING

[75] Inventor: Benzion Landa, Nes Ziona, Israel

[73] Assignee: Indigo N.V., Maastricht, Netherlands

[21] Appl. No.: 08/913,298

[22] PCT Filed: Jun. 6, 1995

[86] PCT No.: PCT/NL95/00194

§ 371 Date: Nov. 18, 1997

§ 102(e) Date: Nov. 18, 1997

[87] PCT Pub. No.: WO96/28929

PCT Pub. Date: Sep. 19, 1996

[30] Foreign Application Priority Data

Mar. 13, 1995 [IL] Israel ......................................... 112983

[51] Int. Cl.[7] .............................. H04N 1/52; H04N 1/29; G06K 15/14
[52] U.S. Cl. ......................... 358/1.9; 358/501; 358/534; 358/300
[58] Field of Search .............................. 395/109; 358/501, 358/502, 534, 535, 536, 298, 300; 347/43, 15, 232

[56] References Cited

U.S. PATENT DOCUMENTS

| | | |
|---|---|---|
| 4,680,625 | 7/1987 | Shoji et al. . |
| 4,860,026 | 8/1989 | Matsumoto et al. ...................... 347/15 |
| 4,924,301 | 5/1990 | Surbrook . |
| 4,965,172 | 10/1990 | Matrick . |
| 5,166,809 | 11/1992 | Surbrook . |
| 5,276,459 | 1/1994 | Danzuka et al. . |
| 5,289,238 | 2/1994 | Lior et al. . |

FOREIGN PATENT DOCUMENTS

| | | |
|---|---|---|
| 454479A2 | 10/1991 | European Pat. Off. . |
| 454479A3 | 10/1991 | European Pat. Off. . |
| 3525414 | 1/1986 | Germany . |
| 9014619 | 11/1990 | WIPO . |

OTHER PUBLICATIONS

Patent Abstracts of Japan vol. 6, No. 60 (E–102) Apr. 17, 1982 in connection with Japanese Application No. 57002162.

International Search Report in connection with Application No. PCT/NL95/00194.

*Primary Examiner*—Scott Rogers
*Attorney, Agent, or Firm*—Greenblum & Bernstein, P.L.C.

[57] ABSTRACT

A printing method including:
  forming a printing bitmap of an image based on a printed solid color density wherein at least one of the colors thereof has a color density substantially greater than the SWOP standard; and
  printing the bitmap in a single printing step.

27 Claims, No Drawings

METHOD AND APPARATUS FOR HALF-TONE PRINTING

FIELD OF THE INVENTION

This invention relates to printing systems and more particularly to halftone printing utilizing an extended color palette.

BACKGROUND OF THE INVENTION

Most printing systems use a standardized color scheme called SWOP. In this color scheme, halftone masks are developed for cyan (C), magenta (M), yellow (Y) and black (K) inks having printed solid optical densities of 1.33, 1.47, 1.0 and 1.6. This color scheme is consistent with the limitations of the standard offset lithographic printing process. Due to the fact that in this process the image is "split" several times during its transfer from printing plate to paper and due to the rheologic limitations placed on the ink by the process, higher printed solid optical densities are not achieved in the standard offset lithographic printing process.

In order to assure standardized results from different print sources, the printed solid optical densities described above have been standardized and standardized color schemes developed around these densities. Printed versions of original images having a higher color density than that available from the standard color printing schemes will have a narrower color gamut in the final printed version than in the original and the half-toning process will either truncate the higher color densities or compress the color gamut of the original into the color density range available with SWOP.

Such printing is not optimum. In order to reproduce photographs and other artwork with high fidelity, a higher printed solid optical density would be required. However, printing such higher optical densities requires additional printing steps.

Two systems utilizing additional printing steps are known. In one such system red(orange), blue (violet) and/or green inks are printed in addition to the standard CMY colors. This improves the color density possible for these colors (and mixed colors having a large proportion of the added colors) but is not effective to increase the color saturation for the entire range of colors.

A second system is based on printing the CMY colors more than once to achieve a thicker layer of ink and thus a higher color density for those portions of the image which require it. This system does give an improved color density, but requires printing each color twice. If process black is printed in addition to CMY a total of seven printing steps, one for black and two each for CMY, are required. This system is marketed by DuPont under the trade name Hypercolor™ Software.

SUMMARY OF THE INVENTION

The present invention is based on using a printing process and inks which enable printing higher printed solid densities with a single printing step utilizing inks or toners having a higher pigment loading. Availability of high, printed solid saturation densities allows for printing a larger color gamut.

The present invention is not limited to any particular half-toning system. While it is applicable to any halftone system since it can increase the color saturation of any system, it does reduce the color density resolution which is available. Thus it is most useful in printing (half-toning) systems which have a high dot resolution (sometimes called, pixel resolution). Dot resolution is usually described in terms of a pixel density such as 300×300 DPI or 800×800 DPI. However, the system especially useful in systems which can print pixels sizes which are greater than a minimum size but are not necessarily integral multiples of that size.

There is therefore provided, in accordance with a preferred embodiment of the invention, a method for forming halftone map comprising:

determining, for a given half-toning scheme, the relationship between printed regions of varying binary print coverage and an apparent color density for the varying coverages, for a printing process which produces printed solid color densities greater than those of the SWOP standard in a single print step;

determining the color densities of an original image;

matching the determined color density with one of the varying coverages; and forming a halftone map, corresponding to the original image, in which areas having a given color density are replaced by binary print coverage in accordance with said half-toning scheme and said matching.

Preferably, the printing process produces a printed solid optical density of at least 1.3, more preferably of at least 1.5, even more preferably of at least 1.7. Most preferably, solid optical print density is 2.0 or more.

The resultant form of the halftone map may be in the form of a film or printing plate, in the form of commands to a printer or in the form of a bitmap.

In a preferred embodiment of the invention the halftone map is printed utilizing the printing process.

Preferably, the printing process is an electrostatic printing process and the printing commands control the charge on a charge carrying member on which an image is formed.

In a preferred embodiment of the invention one halftone map is produced for each of a plurality of colors and wherein each of the halftone maps is printed, in registration with the others, in a color for which the respective map was prepared.

There is further provided in accordance with a preferred embodiment of the invention, a printing method comprising:

forming a printing bitmap of an image based on a printed solid color density substantially greater than 1.0, preferably having a density of 2.0 or more; and printing the bitmap in a single printing step.

DETAILED DESCRIPTION OF PREFERRED EMBODIMENTS

In a preferred, but non-limiting, embodiment of the invention, printing apparatus, such as that described in PCT Publication WO 90/14619, in U.S. Pat. No. 5,289,238 and in U.S. patent application Ser. No. 08/371,117, filed Jan. 11, 1995 and entitled IMAGING APPARATUS AND INTERMEDIATE TRANSFER BLANKET THEREFOR, the disclosures of all of which are incorporated herein by reference, is used as a platform for printing images having a higher color saturation than those previously available in a single print. The voltages and other characteristics described in the above incorporated patents, applications and other publications are not significantly changed in the practice of the present invention.

Other printing methods are also useful in performing the invention, including lithographic printing and powder toner imaging, to the extent that inks or toners which can be printed to high printed solid optical densities are available and which have rheology appropriate to the particular printing or imaging process.

Furthermore, the present invention is not dependent on the particular half-toning scheme used, and the invention will usefully expand the color gamut when used with any half-toning process. It this respect, while the standard half-toning process depends on matching optical densities of an original with measured or standard effective halftone optical densities for inks printed at a standard printed solid optical density as described in the background of the invention, in the present invention the matching is with effective halftone optical densities based on printing at higher solid optical densities.

The difference between the present invention and the standard use of the same half-toning schemes is that the range of color densities available from the half-toning process is increased in proportion to the printed solid optical density achieved.

It should be understood that already existing halftone bit maps, which are prepared using the standard SWOP scale, generally should be remapped using the new system calibration. If the images exist only in halftone form, it may be impossible to recover the full saturation of colors which was available in the original from which the half-tones were produced by performing the inverse of the function used to compress the original color gamut into the SWOP range. If this compression is not known, or cannot be estimated, the full color gamut cannot be recoverable.

However, if the original color density is available, as, for example, from artwork, photographs or digitized images, the halftone and printing process according to the present invention, using higher color density printing, will result in a larger gamut of color densities and a printed image having a higher color fidelity to the original image. In general, the images will have a deeper color in those areas where such deeper colors were present on the original image.

Utilizing the new higher color saturation printing process with a given half-toning scheme results in the same number of color levels as are available when the same scheme is used with standard printing according to the SWOP scale. Thus, while the present invention provides an increased color saturation for any half-toning scheme, better results are achieved when the scheme provides a large number of halftone levels. Many such schemes are available, such as line printing, partial pixel printing in which the half-toning steps are smaller than a single minimum printed pixel size, error diffusion methods and methods which print at different resolutions depending on the variability of the color tone being printed. Such methods are sometimes known. as "FM methods" or stochastic screening methods.

In general a half-toning method according to the present invention includes:
 determining, for a given half-toning scheme, the relationship between printed regions of varying binary print coverage and an apparent color density for the varying coverages, for a printing process which produces printed solid color densities greater than those of the SWOP standard in a single print step;
 determining the color densities of an original image;
 matching the determined color density with one of the varying coverages; and
 forming a halftone map, corresponding to the original image, in which areas having a given color density are replaced by binary print coverage in accordance with said half-toning scheme and said matching.

In a preferred embodiment of the invention, a halftone image is printed, utilizing the printing process, in accordance with the halftone map.

As described above, the process of the invention is applicable to a variety of printing processes. However, the printing process described in the above referenced publications is preferred, due to the preciseness and controllability of the process. For this process liquid toners prepared according to the formulations described below can be printed with densities well above the SWOP densities as indicated.

While, in a preferred embodiment of the invention, utilizing print methods and inks or toners having a solid print optical density of two (2) or more are preferred, improved color saturation is achieved for any significant printed solid color density increase over the standard density. For example a combination of printing method and ink or toner which produces lesser increases in solid print optical density, such as optical densities of 1.3 (for yellow), 1.5 (for cyan) or 1.7 (for magenta) will result in greatly improved color fidelity and an image having, subjectively, a visibly richer color than images produced using the SWOP scale.

In a preferred embodiment of the invention, toners for use in liquid toner imaging according to the invention are prepared in accordance with the following procedure:
 1) Mixing
 736 grams of Elvax 5610 (ethylene copolymer by Dupont)(component A), 231 grams of Finess Red 2B pigment (Toyo Ink), and 3 grams of BT 483D pigment (Coockson) (collectively component B) and 25 grams of Aluminum stearate (component C) are mixed on a two roll mill heated to 140° C. for one hour. The material is cooled, shredded in a shredder and cryogenically ground in a RETSCH centrifugal mill to form particles suitable for grinding.
 2) Milling and Grinding
 The result of step 1 and Isopar L (EXXON) are charged, to a non-volatile solids percentage of 20%, into a 1S attritor (Union Process Inc. Akron Ohio), charged with ³⁄₁₆" carbon steel balls and ground at 250 RPM and 25° C. for 2 hours. The resulting mixture is a toner concentrate comprising toner particles, of an average. particle size of about 1.6 micrometers and having fibrous extensions, dispersed in Isopar L.
 3) Diluting and Charging
 The toner concentrate is diluted to a non-volatile solids density of 1.7 to 2.0 percent by the addition of Isopar L and Marcol 82 to give an overall proportion of 0.2 to 2% of Marcol 82 in the total liquid in the liquid toner. It is charged, preferably using charge director as described in U.S. Pat. No. 5,346,796, the disclosure of which is incorporated herein by reference, or other charge directors known in the art, preferably to a charge to unit mass ratio of 150–200 $\mu$Coul/gram. The desired level of charging is dependent on the exact proportion of component B in the toner particles and the solid print optical density desired. The charging can also be performed on the concentrate which is then diluted.

For yellow toner, 436 grams of Elvax 5610, 234 grams of D1355DD pigment (BASF) and 30 grams of Aluminum Stearate are utilized in step 1), and the grinding speed is 200 rpm in step 2). The average particle size is approximately 2.32 micrometers.

For cyan toner, 758 grams of Elvax 5610, 102 grams of BT 583D pigment, 102 grams of BT 788D pigment (both Coockson), 8.3 grams of D 1355 DD pigment (BASF) and 30 grams of Aluminum monostearate are used in step 1) and the resulting particle size is about 1.5 micrometers.

For black toner 773 grams of Elvax 5610, 193.2 grams of Mogul L carbon black (Cabot), 19.3 grams of BT 583D pigment (BASF) and 14.5 grams of Aluminum monostearate are used in step 1) and the resulting particle diameter is approximately 2.8 micrometers.

When used in a standard printing process in an E-Print 1000 printer, available from Indigo, Inc. Woburn Mass., USA, using the standard processing voltages, the resulting printed solid optical densities can be controlled to 170±0.5, 1.85±005, 2.05±0.05 and 1.5±0.05 for black, magenta, cyan and yellow toner produced in accordance with the above described procedure.

It should be understood that the pigment loading for these toners is much higher than normally used in this printer as described in U.S. patent application Ser. No. 08/371,117 and as generally used in the art. Furthermore, Elvax 5610 is a polymer whose viscosity is much too low for the normal liquid toner process of this printer. However, the combination of low viscosity polymer and high pigment loading results in a toner whose rheological properties are suitable for liquid toner printing.

I claim:

1. A method for printing a halftone image comprising:

determining, for a given half-tone image transfer printing process which produces printed solid color densities greater than those of the SWOP standard in a single print step, the relationship between printed regions of varying binary print coverage and an apparent color density for the varying coverages;

determining the color densities of an original image;

matching the determined color density with that of one of the varying coverages;

forming a halftone map, corresponding to the original image, in which areas having a given color density are replaced by binary print coverage in accordance with said half-toning scheme and said matching; and printing the image using the half-tone image transfer printing process.

2. A method according to claim 1 wherein the printing process produces a printed solid optical density of at least 1.3 for yellow.

3. A method according to claim 1 wherein the printing process produces a printed solid optical density of at least 1.5 for yellow and cyan.

4. A method according to claim 1 wherein the printing process produces a printed solid optical density of at least 1.7.

5. A method according to claim 1 wherein the printing process produces a printed solid optical density of at least 2.0.

6. A method according to claim 1 wherein the resultant halftone map is in the form of a film or printing plate.

7. A method according to claim 1 wherein the resultant halftone map is in the form of printing commands to a printer.

8. A method according to claim 7, wherein the printing commands are in the form of a bit map.

9. A method according to claim 8, wherein the printing process is an electrostatic printing process and wherein the bit map controls the charge on a charge carrying member on which an image is formed.

10. A method according to claim 7 wherein one halftone map is produced for each of a plurality of colors and wherein each of the halftone maps is printed, in registration with the others, in a color for which the respective map was prepared.

11. A method according to claim 6, wherein the printing process is an electrostatic printing process and wherein the printing commands control the charge on a charge carrying member on which an image is formed.

12. A printing method comprising:

forming a printing bitmap of an image based on a printed solid color density wherein at least one of the colors thereof has a color density substantially greater than the SWOP standard; and printing the bitmap in a single printing step utilizing an image transfer printing process.

13. A method according to claim 12 wherein the single printing step produces a printed solid optical density of at least 1.3 for yellow.

14. A method according to claim 12 wherein the single printing step produces a printed solid optical density of at least 1.5 for yellow and cyan.

15. A method according to claim 12 wherein the single printing step produces a printed solid optical density of at least 1.7.

16. A method according to claim 12 wherein the single printing step produces a printed solid optical density of at least 2.0.

17. A method according to claim 12 wherein the resultant printing bitmap is in the form of printing commands to a printer.

18. A method according to claim 12, wherein the printing step is part of an electrostatic printing process and wherein the printing commands control the charge on a charge carrying member on which an image is formed.

19. A method according to claim 12 wherein a bit map is produced for each of a plurality of colors and wherein each bit map is printed, in registration with the others, in a color for which the map was prepared.

20. Apparatus for printing comprising:

means for forming a half tone image having a solid color density greater than those of the SWOP standard on a surface; and means for transferring the image to a further surface.

21. Apparatus according to claim 20 which means for forming produces a printed solid optical density of at least 1.3 for yellow.

22. Apparatus according to claim 20 which means for forming produces a printed solid optical density of at least 1.5 for yellow and cyan.

23. Apparatus according to claim 20 which means for forming produces a printed solid optical density of at least 1.7.

24. Apparatus according to claim 23 wherein the solid optical density is at least 2.0.

25. Apparatus according to claim 20, wherein the means for forming includes means for controlling the charge on a charge carrying member on which an image is formed.

26. Apparatus according to claim 20 wherein one image is formed for each of a plurality of colors and wherein each of the color images is printed, in registration with the others.

27. Apparatus according to claim 20, wherein the printing apparatus is an electrostatic printing apparatus.

* * * * *